(12) United States Patent
Gao

(10) Patent No.: US 6,574,393 B2
(45) Date of Patent: Jun. 3, 2003

(54) COMPACT OPTICAL FIBER AMPLIFIER MODULE

(75) Inventor: Renyuan Gao, Frazer, PA (US)

(73) Assignee: Photon-X, Inc., Malvern, PA (US)

( * ) Notice: Subject to any disclaimer, the term of this patent is extended or adjusted under 35 U.S.C. 154(b) by 0 days.

(21) Appl. No.: 09/993,774

(22) Filed: Nov. 27, 2001

(65) Prior Publication Data

US 2002/0191902 A1 Dec. 19, 2002

Related U.S. Application Data

(60) Provisional application No. 60/253,224, filed on Nov. 27, 2000, and provisional application No. 60/253,225, filed on Nov. 27, 2000.

(51) Int. Cl.⁷ .............................. G02B 6/28; H01S 3/00; H01S 3/091
(52) U.S. Cl. .............................. 385/24; 385/31; 385/33; 359/341.1; 359/341.33; 372/71; 372/703
(58) Field of Search .............................. 385/24, 27, 31, 385/32, 33, 42, 5; 359/337.2, 341.1, 341.33, 337.4; 372/69, 20, 71, 703

(56) References Cited

U.S. PATENT DOCUMENTS

| | | | |
|---|---|---|---|
| 4,075,120 A | 2/1978 | Myers et al. | ............. 252/301.4 |
| 4,859,016 A | * 8/1989 | Shaw et al. | ...................... 385/5 |
| 5,204,923 A | * 4/1993 | Grasso et al. | .................. 385/24 |
| 5,563,979 A | 10/1996 | Bruce et al. | ................. 385/142 |
| 6,292,292 B1 | 9/2001 | Garito et al. | ................ 359/341 |
| 6,330,254 B1 | * 12/2001 | Hung | .......................... 372/20 |
| 6,437,906 B1 | * 8/2002 | Di Pasquale et al. | . 359/341.1 X |

FOREIGN PATENT DOCUMENTS

| | | |
|---|---|---|
| EP | 0 404 152 A2 | 12/1990 |
| EP | 0 700 137 A2 | 3/1996 |
| EP | 0 848 463 A2 | 6/1998 |
| JP | 3-71115 | 3/1991 |
| JP | 4-340933 | 11/1992 |
| JP | 5-136498 | 6/1993 |
| JP | 5-190939 | 7/1993 |
| JP | 9-265116 | 10/1997 |
| JP | 11-121837 | 4/1999 |

OTHER PUBLICATIONS

Ruikun Wu et al., "High Power Rare–Earth–Doped Phosphate Glass fiber and Fiber Laser", OSA, Advanced Solid–State Lasers, Jan. 28–31, 2001, Seattle, Washington, pp. 1–3.

Michael J. Myers et al., "High Gain Short Length Phosphate Glass Erbium–Doped Fiber Amplifier Material", OSA, Optical Fiber Communications (OFC) 2001, Selected Publication #105, pp. 1–3.

Shibin Jiang et al., "Net Gain of 15.5 dB from a 5.1 cm–long $Er^{3+}$–doped Phosphate Glass Fiber", pp. 2–4.

Jiang et al., "$Er^{3+}$–doped phosphate glasses for fiber amplifiers with high gain per unit length," Journal of Non–Crystalline Solids (2000), pp. 364–368.

Ainslie et al., "Erbium doped fibres for efficient optical amplifiers," IEE Proceedings (Aug. 1990), 137:205–208.

Copy of International Search Report mailed Nov. 11, 2002.

* cited by examiner

Primary Examiner—Phan T. H. Palmer
(74) Attorney, Agent, or Firm—Finnegan, Henderson, Farabow, Garrett & Dunner, L.L.P.

(57) ABSTRACT

An optical fiber amplifier module is disclosed which comprises a signal path locatee between a signal input and a signal output. A WDM coupler and an amplifying gain medium are disposed along the signal path. A pump laser is disposed out of the signal path in a manner that allows a pump signal from the pump laser to reflect off the WDM coupler and enter the signal path. An embodiment utilizing a second WDM coupler and a second pump laser is also disclosed.

31 Claims, 7 Drawing Sheets

COMPACT OPTICAL FIBER AMPLIFIER MODULE

The present application claims priority benefit to United States Provisional Application Nos. 60/253,224 and 60/253,225, both of which were filed on Nov. 27, 2000.

FIELD OF THE INVENTION

The present invention relates to optical amplifier fiber modules and optical amplifier fibers.

BACKGROUND OF THE INVENTION

Optical fibers have attracted a great deal of attention in the telecommunication industry because of their ability to carry larger quantities of information with longer distances between signal boosters than is possible using conventional metal wires. One reason for this is that in conventional wires, such as copper wire and coaxial cable, attenuation increases exponentially with signal frequency, making high-speed transmission over long distances impractical. While light signals in optical fibers also suffer from attenuation as a light signal travels along the fiber, it is significantly less than the loss found in conventional wires. In addition, attenuation in $SiO_2$ fibers is independent of signal frequency. Both of these advantages help the optical fiber handle more information over larger ranges than is possible in conventional wires.

In long fiber spans, attenuation may weaken the signal to the point where it cannot excite a photodetector in the receiver. The result is a failed transmission. To cope with this problem, the light signal can be amplified along the length of the fiber span. In optical communication networks, research has focused on two approaches to amplify light signals: repeaters and optical amplifiers.

A repeater is a device that receives an optical signal, converts the optical signal to an electrical signal, amplifies the electrical signal, and converts the amplified electrical signal back to an optical signal. As will be appreciated, repeaters, are time consuming and lossy. An optical amplifier, on the other hand, amplifies the optical signal without the need for conversion to an electrical signal. Other benefits of optical amplifiers include high gain, low noise, low cross talk and intermodulation distortion, bit-rate transparency and polarization insensitive gain. In the development of optical amplifiers, erbium doped optical amplifier fibers have emerged as the fiber of choice because the characteristic gain bandwidth of these fibers is within a telecommunication window of 1.5 microns (1500 nm), a bandwidth commonly used in fiber optic commercial systems.

Erbium doped fibers are able to act as optical amplifiers because of their ability to exploit the energy levels of erbium, shown in FIG. 1. For example, when a photon of light, such as a 980 nm pump photon, is directed on a glass doped with $Er^{3+}$, there is a high probability that the pump photon will be absorbed, exciting a ground state $^4I_{15/2}$ ion to the $^4I_{11/2}$ level. From the $^4I_{11/2}$ level, the ion non-radiatively relaxes to the $^4I_{13/2}$ level 3, releasing energy as vibrational energy, called phonons. The $^4I_{13/2}$ level is metastable, possessing a lifetime of around 10 ms in silica glass. The ion in the metastable $^4I_{13/2}$ level eventually emits a photon of light at around 1550 nm during fluorescence, the process whereby the excited electron of the ion radiatively returns to a lower energy level, such as the ground state. A more detailed analysis reveals that in erbium, the $^4I_{13/2}$ level actually consists of seven sublevels, and the $^4I_{15/2}$ consists of eight sublevels, making 56 possible transitions between the metastable and ground state.

To illustrate amplification, an $Er^{3+}$ ion in the metastable $^4I_{13/2}$ state can be perturbed by a 1550 nm signal photon (before it has had a chance to fluoresce). In this case, the 1550 nm signal photon stimulates the excited ion such that it emits a photon of the same wavelength, in phase, and propagating in the same direction as the stimulating photon. As the $Er^{3+}$ ion returns to the ground state, there will now be two 1550 nm signal photons, the original stimulating photon and the photon emitted from the excited $Er^{3+}$ ion. Amplification is achieved.

Alternatively, absorption from the ground state to the $^4I_{13/2}$ state can also occur. In this case, an incoming 1550 nm signal will be absorbed, exciting some $Er^{3+}$ ions in the ground state. An inversion is created as the $Er^{3+}$ ion population continues to be raised to the excited state. At 100% inversion, no more ions remain in the ground state to absorb incoming photons, and an incoming 1550 nm signal will be strongly amplified.

As can be seen, gain is limited by the $Er^{3+}$ ion concentration. Problems in fabrication arise when attempting to increase the $Er^{3+}$ ion concentration. One problem is that of clustering, where doped $Er^{3+}$ ions cluster together, destroying an individual atoms ability to generate amplification. Currently, only low $Er^{3+}$ doping concentrations in $SiO_2$ erbium doped fiber amplifiers (EDFA's) have been achieved in optical amplifier fiber networks, with fiber lengths that exceed tens of meters. One possible solution is discussed in U.S. Pat. No. 4,075,120 to Myers et al. However, Myers only discusses the material composition of glasses with high $Er^{3+}$ doping concentration for making lasers, and not fiber amplification. No phosphate erbium doped glass fiber has been commercialized for EDFA applications. This is primarily due to the inability of researchers to determine correct parameters to develop a successful workable fiber.

In addition, for amplification, compact and integrated optical amplifiers are desired in the deployment of metro and access optical networks. Known optical amplifiers are designed and assembled based on discrete active and passive optical components including. erbium doped optical amplifier fibers, laser diode modules, optical isolators, wavelength division multiplexing couplers, tap couplers, etc. Conventional amplifiers are manufactured using a box-in-a-box approach, where prepackaged devices are coupled together by splicing optical amplifier fibers, also known as fiber pigtails, in order to manufacture optical amplifiers.

Conventional optical amplifiers may be costly to manufacture and their use in optical networks may result in unwanted optical loss. Additionally, conventional optical amplifiers tend to be rather large, partially due to the fact that the erbium doped optical amplifier fiber in each optical amplifier can be up to tens of meters long. Even if the optical amplifier fiber is coiled up to save space, the bend radius of the fiber still requires a relatively large module package. In order to reduce the size of the optical amplifier module, an integrated solution is needed.

Thus, there is a need to overcome these and other problems of the related art and to provide an optical amplifier fiber, where the optical amplifier fiber is capable of commercial application. The present invention illustrated in the following description, is directed to solving one or more of the problems set forth above.

SUMMARY OF THE INVENTION

In accordance with the present invention, a compact optical amplifier module is disclosed which incorporates high gain amplifying gain mediums, such as high gain rare earth doped phosphate glass optical amplifier fibers or waveguides. Components of the optical amplifier module are optically coupled together by free space coupling, as opposed to conventional physical coupling techniques.

In an exemplary embodiment of the present invention there is an optical fiber amplifier module comprising a signal path located between a signal input and a signal output. A WDM coupler and an amplifying gain medium are optically disposed along the signal path. A pump laser which emits a pump signal is disposed out of the signal path in a manner that allows the pump signal to reflect off the WDM coupler and enter the signal path. The WDM coupler may be placed upstream of the amplifying gain medium, so that the pump signal is reflected into the upstream end of the amplifying gain medium. In an alternative embodiment, the WDM coupler is placed downstream of the amplifying gain medium, so that the pump signal is reflected into the downstream end of the amplifying gain medium. According to a third embodiment, WDM couplers may be placed both upstream and downstream of the amplifying gain medium, so that pump signals may be reflected into both ends of the amplifying gain medium.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference is made to U.S. patent application Ser. No. 09/507,582, filed Feb. 18, 2000, which issued as U.S. Pat. No. 6,292,229 on Sep. 18, 2001; U.S. patent application Ser. No. 09/722,821, filed Nov. 28, 2000; U.S. patent application Ser. No. 09/722,822, filed Nov. 28, 2000; and U.S. patent application Ser. No. 09/993,775, filed Nov. 27, 2001 [High Gain Erbium Doped Phosphate Glass Optical Amplifier Fiber, U.S. Provisional Application No. 60/253,225,] which are all owned by the assignee of the present invention and are incorporated by reference herein in their entirety.

Reference will now be made in detail to the present embodiments of the invention, examples of which are illustrated in the accompanying drawings. Wherever possible, the same reference numbers will be used throughout the drawings to refer to the same or like parts.

Figure 2:
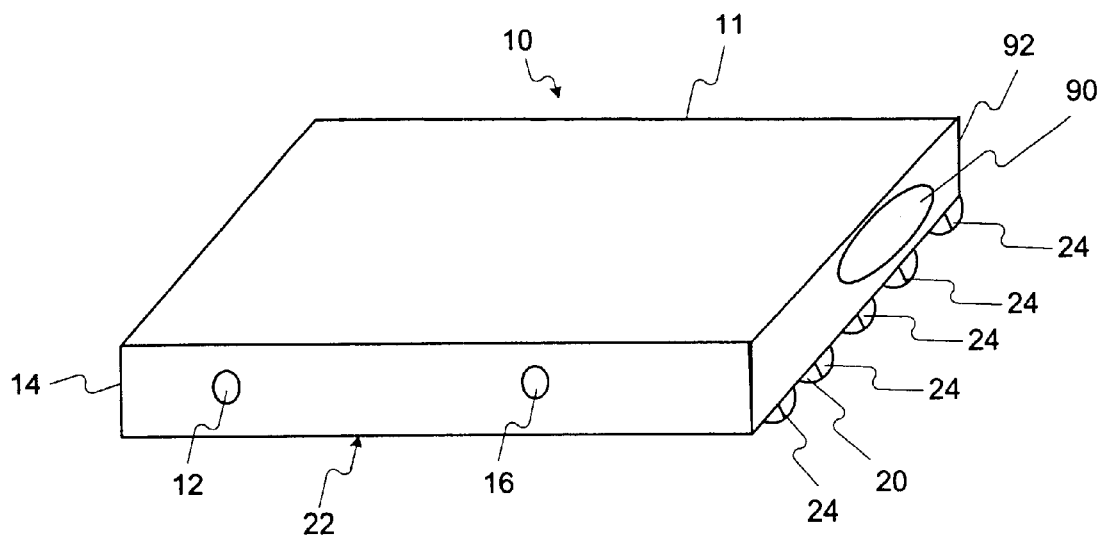
FIG. 2 is a perspective view of an embodiment of an optical fiber amplifier module according to the present invention.

FIG. 2 discloses a perspective view of a compact optical amplifier fiber module generally represented by the numeral 10 (hereinafter "module 0") according to an embodiment of the present invention. Module 10 includes a shell 11 which is generally parallelepiped in shape with a signal input 12 on a first face 14 and a signal output 16, also on first face 14. However, those skilled in the art will recognize that module 10 can have a shape other than parallelepiped, and that signal input 12 and signal output 16 can be on different faces, if desired. In an embodiment of the present invention, a heat sink 20 can be disposed on at least a bottom face 22 of module 10. Heat sink 20 can have a plurality of fins 24 to dissipate heat generated in module 10. In certain embodiments, shell 11 is constructed from a metallized polymer to conduct heat to heat sink 20. However, those skilled in the art will recognize that shell 11 can be formed from other components, such as a non-metallized polymer, or a metal, such as aluminum. Shell 11 can be fabricated from any of several known methods, including, but not limited to, stamping, pressing, or injection molding.

Figure 3A:
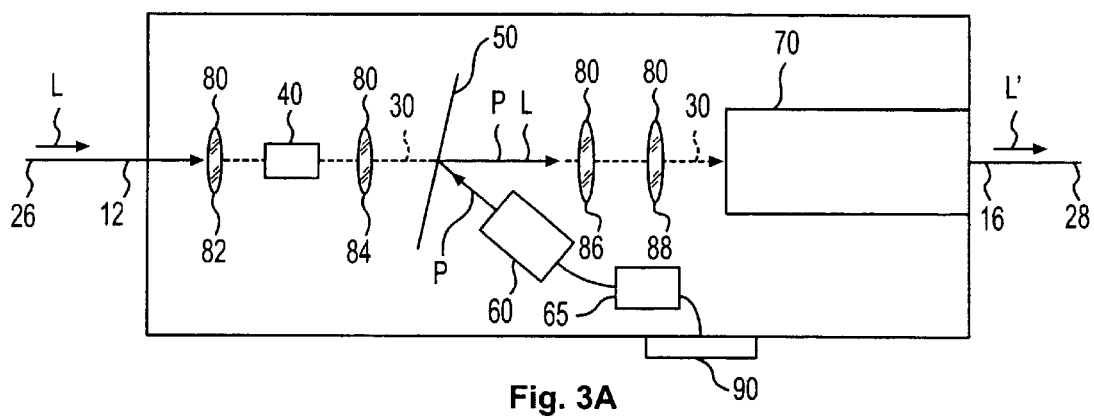
FIGS. 3A–3C are schematic drawings of exemplary embodiments of optical fiber amplifier modules according to the present invention.
Figure 3B:
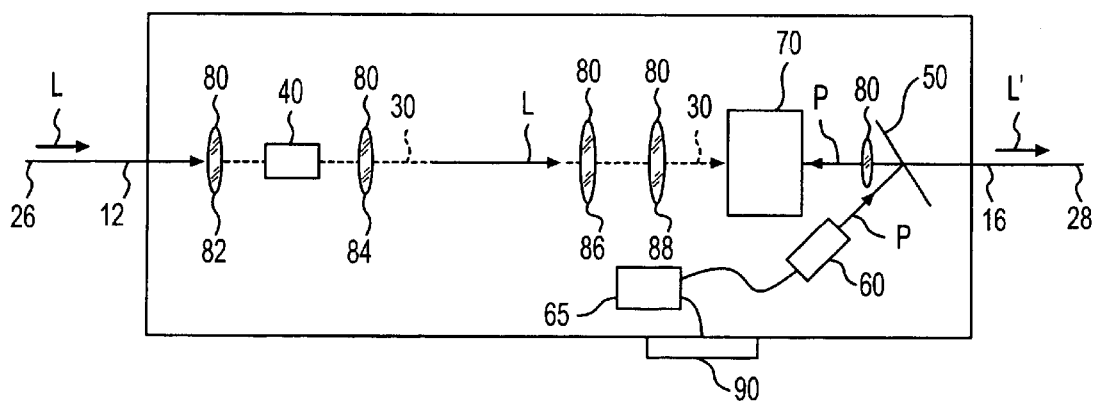
Figure 3C:
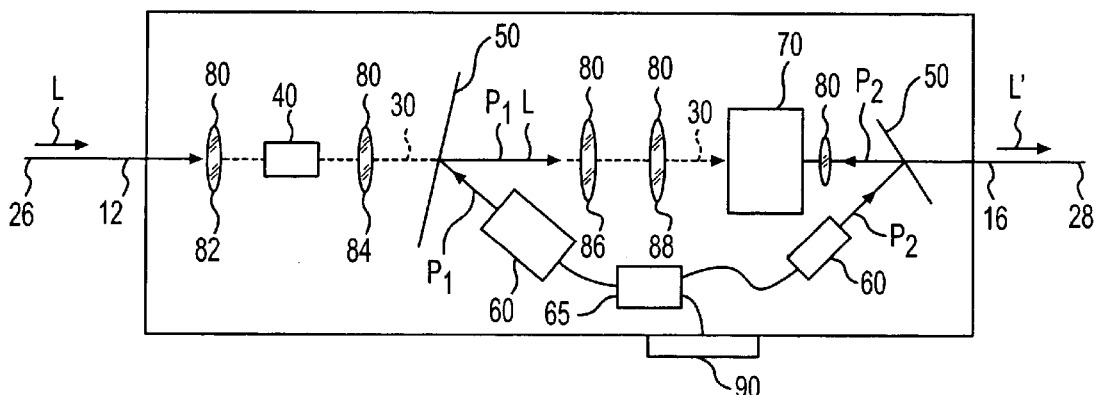

FIGS. 3A–3C show alternative exemplary embodiments of module 10. In FIG. 3A, a pre-amplified light signal "L" is transmitted along an input fiber 26, which is connected to signal input 12. The light signal L is transmitted through module 10, which increases the energy level of the light signal L, resulting in an amplified light signal L'. The amplified light signal L' is transmitted to signal output 16, which is connected to an output fiber 28. A signal path 30 is optically disposed within module 10 between signal input 12 and signal output 16. As used herein, the term "signal path" means the path of the light signal L, as amplified to the amplified light signal L', between input fiber 26 and output fiber 28.

Module 10 includes both photonic components and electronic components. The photonic components will now be described. Within module 10, a free space optical isolator 40 is disposed along signal path 30, and may be proximate to signal input 12. Optical isolator 40 suppresses backscattered light generated downstream of optical isolator 40 and prevents the backscattered light from traveling upstream to signal input 12. Optical isolators are well known to those skilled in the art and will not be discussed in more detail herein. As used herein, the terms "downstream" and "upstream" are defined as directions from left to right and from right to left, relative to a stated component or components as shown in FIG. 3A, respectively.

A wavelength division multiplexing (WDM) coupler 50 is disposed within module 10 along signal path 30 downstream of optical isolator 40. WDM coupler 50 allows the light signal L to pass from the upstream side of WDM coupler 50 to the downstream side of WDM coupler 50, but reflects the pump signal P from a pump laser 60, so that the light signal L and the pump signal P are effectively combined together. WDM coupler 50 contemplated in the present embodiment uses a thin film based filter, although those skilled in the art will recognize that other types of WDM couplers can be used.

In an embodiment of the present invention, pump laser 60 is disposed downstream of WDM coupler 50, but out of signal path 30. Pump laser 60 is not directly coupled to WDM coupler 50, but uses free space coupling to optically couple pump laser 60 to WDM coupler 50. Pump laser 60 is disposed such that a pump signal "P" from pump laser 60 reflects off the downstream side of WDM coupler 50 and enters signal path 30 with the light signal L downstream of WDM coupler 50. The light signal L and the pump signal P are coupled in free space and are collimated for further downstream transmission. In an embodiment, the pump laser can be a single mode laser, but in other embodiments, multimode lasers may also be used. Power for the laser may range, for example, from 20 to 300 milliwatts.

A high gain amplifier amplifying gain medium 70 is disposed along signal path 30 downstream of WDM coupler 50 and transmits the light signal L from WDM coupler 50 to signal output 16. As the light signal L travels along amplifying gain medium 70, the light signal L is amplified to the light signal L', which will be described in more detail later herein.

Figure 4A:
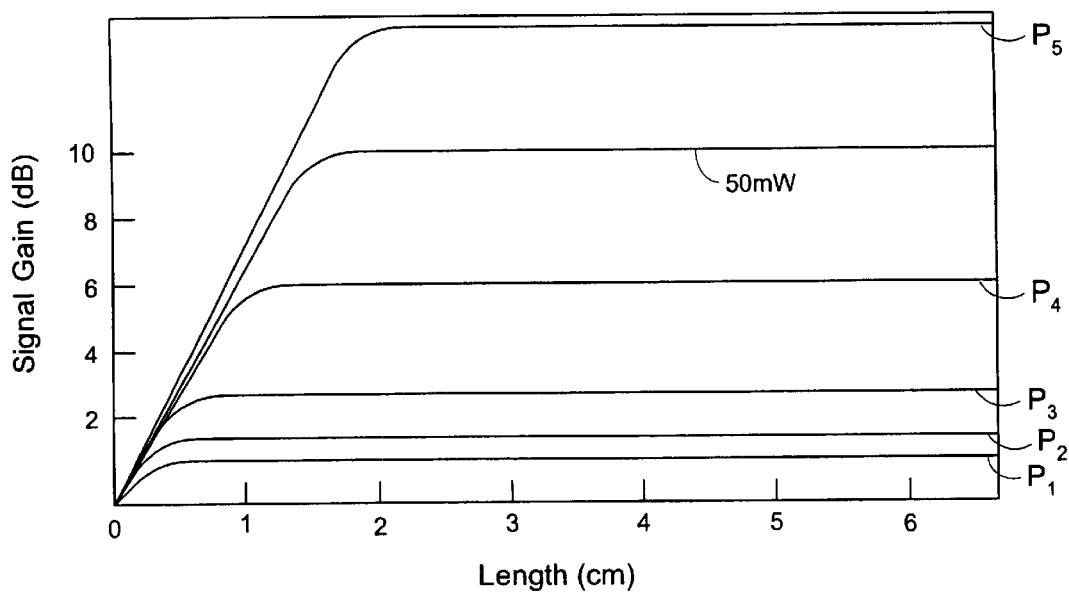
FIGS. 4A and 4B are graphs showing light amplification vs. length of optical amplifier fiber.
Figure 4B:
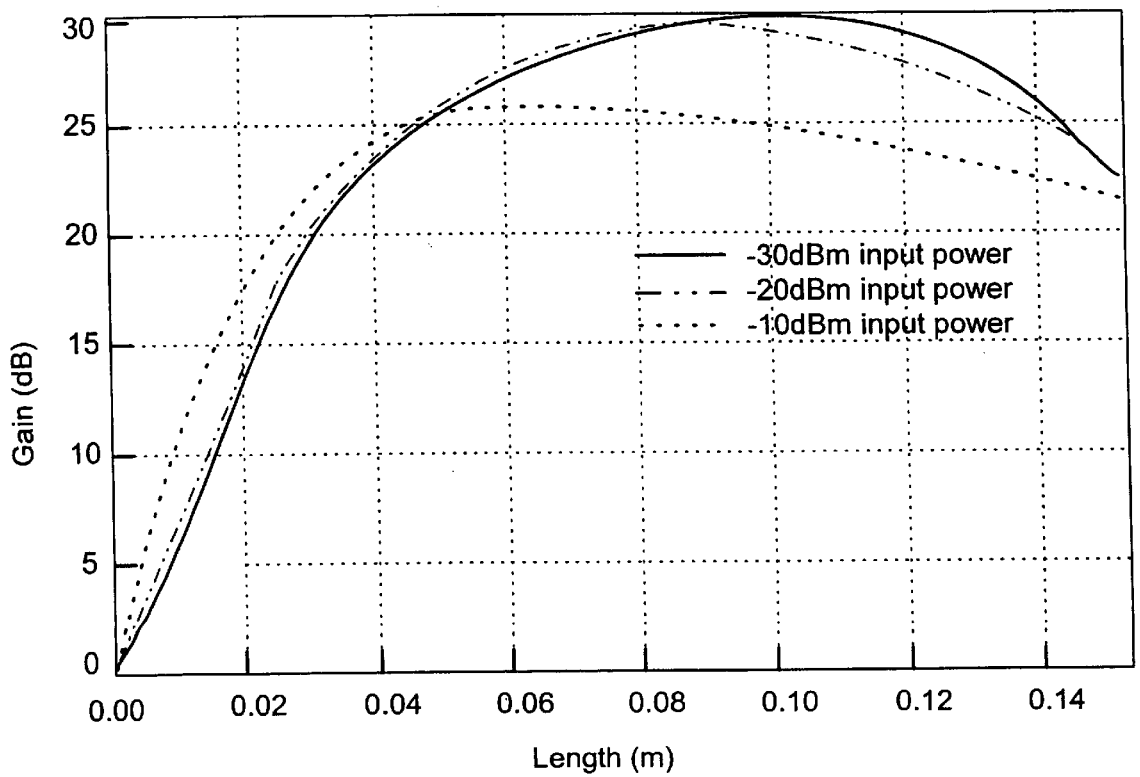

The amount of amplification is a function of, among other things, the length of the amplifying gain medium, and the power of the pump laser. For example, in an embodiment where amplifying gain medium 70 is 5 cm and where a pump laser having a power of 50 mW is used, the light signal L is amplified approximately 10 dB. A graph showing light signal amplification vs. amplifying gain medium length for a 50 mW pump laser as well as for other, increasing pump powers $P_1$, $P_2$, $P_3$, $P_4$, $P_5$ is shown in FIG. 4A. In another exemplary embodiment where amplifying gain medium 70 is 5 cm and where a pump laser having a power of 100 mW is used, the light signal L is amplified approximately 26 dB. A graph showing light signal amplification vs. amplifying gain medium length for a 100 mW pump laser as well as for other, increasing signal pump powers $P_1$, $P_2$, $P_3$ is shown in FIG. 4B. The other parameters for the embodiment of FIG. 4B are shown in Table 1.

TABLE 1

Parameters for a High Gain Erbium Doped Phosphate Glass Amplification Fiber.

| Parameter | Value |
| --- | --- |
| Erbium doped core diameter | 4 μm |
| Numerical aperture of waveguide | 0.14 |
| Erbium ion density | $1 \times 10^{21}$ cm$^{-3}$ |
| Erbium metastable state lifetime | 8 msec |
| Pump wavelength | 980 nm |
| Pump direction | Co-propagation pump |

The length of the amplifying gain medium may be chosen depending on the amplification desired and the type of amplifying gain medium used. For example, where the amplifying gain medium comprises a doped fiber, the optimum length of the amplifying gain medium may depend on the dopant concentration. In one embodiment, amplifying gain medium 70 can be approximately 2 cm long by using a high gain rare earth doped phosphate glass optical amplifier fiber (REGA). The rare earth concentration may exceed $10^{21}$ ions/cm$^3$. In other embodiments, amplifying gain medium 70 can be greater or less than 2 cm long, depending on factors such as the material used and the rare earth ion concentration. In certain embodiments, the length of the amplifying gain medium may range from about 1 to 8 cm long.

Various types of amplifying gain mediums may be used. For example, the amplifying gain medium 70 may comprise an optical amplifier fiber, planar waveguide, or any other light transmitting medium. In certain embodiments, the amplifying gain medium may comprise glass or polymer materials. In further embodiments, the amplifying gain medium may be comprised of dopants, such as, for example, rare earth dopants. In an embodiment of the present invention, amplifying gain medium 70 can be doped with erbium. However, those skilled in the art will recognize that amplifying gain medium 70 can be doped with other elements or combinations of elements, including for example, cerium, praseodymium, lanthanum, neodymium, promethium, samarium, europium, gadolinium, terbium, dysprosium, holmium, thulium, ytterbium, and lutetium. Additionally, amplifying gain medium 70 may be manufactured from a gain medium such as an rare earth doped optical polymer, although those skilled in the art will recognize that the amplifying gain medium 70 can be manufactured from other gain media, such as high rare earth concentration glasses.

Certain embodiments where the amplifying gain medium 70 comprises a waveguide, otherwise known as a planar optical waveguide, will now be described. The waveguide may be either glass or polymeric and may be doped, for example, with rare earth dopants such as erbium. For example, in an embodiment, the waveguide may be a rare earth doped planar waveguide. In a further embodiment, the waveguide may be a vertically integrated-waveguide. In certain embodiments, the waveguide may be straight or curved. One example of a curved waveguide may be found in U.S. patent application Ser. No. 09/877,871, filed Jun. 8, 2001 by the present inventor, and entitled "Rare Earth Doped Optical Waveguide And Laser With Optimal Bending Curves", which is owned by the assignee of the present invention and which is herein incorporated by reference in its entirety. If amplifying gain medium 70 is a waveguide assembly, the output of the waveguide assembly is pigtailed to output fiber 28 in a manner known to those skilled in the art.

Certain embodiments where the amplifying gain medium 70 comprises an optical amplifier fiber will now be described. The optical amplifier fiber may be either glass or polymeric and may be doped, for example, with rare earth dopants. In other embodiments, the amplifying gain medium 70 can comprise a chirped optical amplifier fiber. For example, in an embodiment, the fiber may comprise a rare earth doped optical polymer.

Figure 5:
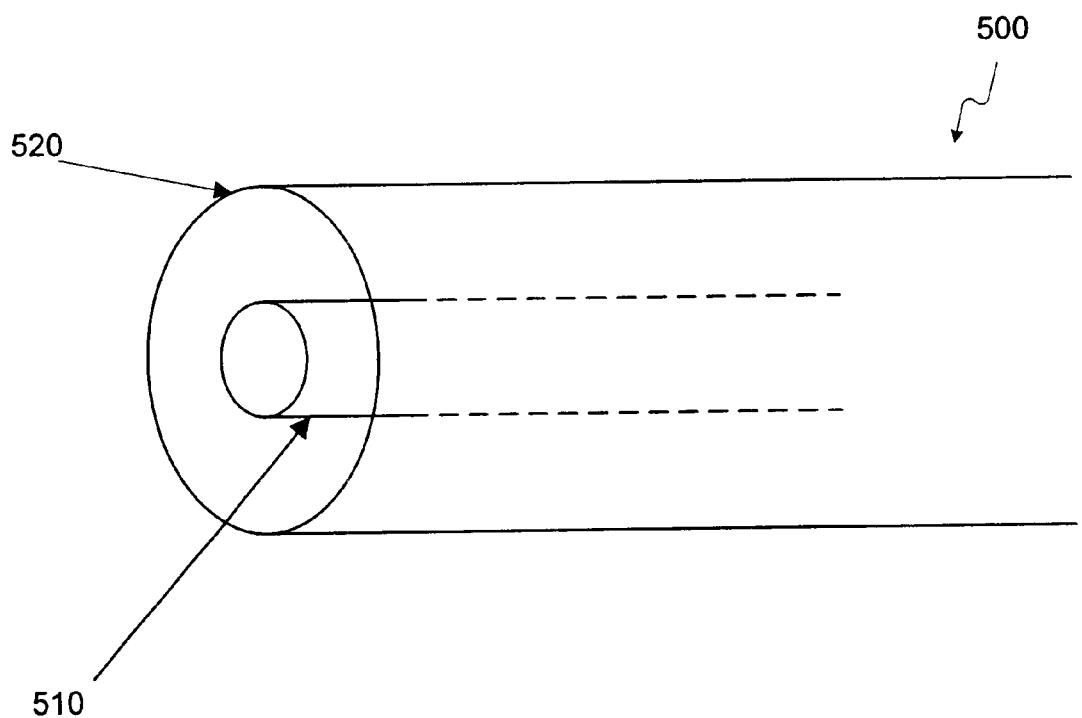
FIG. 5 is a diagram of an optical amplifier fiber.

Referring to FIG. 5, in an exemplary embodiment the optical amplifier fiber can use a rare earth doped glass. Increasing the rare earth ion concentration can reduce the length of the optical amplifier fiber. In certain embodiments the rare earth doped glass can be a REGA. In an exemplary embodiment, an optical amplifier fiber 505 can be made by fabricating a core and a cladding using a glass melting technique. In this embodiment, a core 510 and a cladding 520 can be fabricated from a rod and tube respectively, for example, when using the rod and tube method, from which the high concentration rare earth doped optical amplifier fiber can be drawn. By selection of materials and fiber parameters of the present invention, amplification can be achieved and tailored to a desired level.

In certain embodiments of the present invention, rare earth doping of REGA can be accomplished using any of the rare earth elements. For example, the doping can be selected from the group consisting of lanthanum, cerium, praseodymium, neodymium, promethium, samarium, europium, gadolinium, terbium, dysprosium, holmium, erbium, thulium, ytterbium, and lutetium. Alternatively, doping can use a combination of two or more of the rare earth elements. It is useful to have the doping in core 510 in the range of 0.5 wt. % to 20 wt. %. In an embodiment the concentration of rare earth dopant in core 510 can be in the range of greater than 3.5 wt. % to 20 wt. %.

An exemplary embodiment of fabricating the optical amplifier fiber begins by forming a fiber pre-form cladding and a fiber pre-form core. The fiber pre-form core and the fiber pre-form cladding can be made by precision machining of bulk glass materials. In certain embodiments, the bulk glass can be phosphate glass materials. To achieve amplification, core phosphate glass 510 can be doped with the rare earth material. Phosphate prevents clustering of the rare earth dopants, allowing high concentrations of rare earth dopants to be incorporated into the core material. In addition, the inclusion of phosphate allows the rare earth dopants to be uniformly distributed throughout the core. High concentrations and uniform distribution of rare earth elements promotes efficient amplification. In certain embodiments, it is useful to avoid having hydrogen and other Group IA elements in the core. These elements may cause clustering of the rare earth element or quench the radiative lifetimes of the optical amplifier fibers. Similarly, care is taken to prevent O—H or water from being incorporated into the fiber because of their quenching effects.

Another parameter of the optical amplifier fiber is the diameter ratio, which is the ratio of the diameter of core 510 to the diameter of cladding 520. In an exemplary embodiment, the cladding outer diameter can be in the range of 1 and 5 cm while the diameter of the core can be in the range of 2 μm to 10 μm. In certain embodiments, the core diameter can be in the range of 2 μm to less than 4 μm, or in the range of greater than 6 μm to 10 μm. The diameter ratio can be in the range of 0.04±0.004. The outer diameter of the fiber can be in the range of 100 μm to 150 μm.

Adjusting the refractive indices of core 510 and cladding 520 allows the numerical aperture (NA) of the fiber 505 to be adjusted. NA is defined by the following formula:

$$NA=(n_{core}^2-n_{cladding}^2)^{1/2} \quad (1)$$

where $N_{core}$ is the core index of refraction and $n_{cladding}$ is the cladding index of refraction. Correspondingly, NA can be adjusted by adjusting either or both of $N_{core}$ or $N_{cladding}$.

In an exemplary embodiment, when the NA is in the range of 0.1 to 0.3, single mode propagation of the pump and signal can be achieved. In certain embodiments, NA can be in the range of 0.04 to less than 0.216, and in other embodiments, NA can be in the range of greater than 0.216 to 0.3.

Different dopants can be used to adjust the index of refraction of the material. In an exemplary embodiment, germanium can be used to adjust the index of refraction of either or both of the core and the cladding. In other embodiments, the doping can be aluminum, or combinations of germanium and aluminum. Similarly, lanthanum has been found to aid in fabricating optical amplifier fibers and it can be used separately, or in combination with aluminum and/or germanium.

In an embodiment of the present invention, when the materials and fiber parameters are selected, the spectroscopic and thermal properties of the optical amplifier fiber can be tailored. For example, according to an exemplary embodiment of the present invention, the radiative lifetime of the core can be in the range of 7.0 to 9.0 milliseconds at 1535 nm. In addition, the fluorescence lifetime of the core can be greater than 7.5 milliseconds at 1535 nm.

Thermal properties that can be controlled include transformation point and the coefficient of thermal expansion. In an embodiment of the present invention, the transformation point difference between core 510 and cladding 520, measured in (°C.), can be less than 5%. The thermal expansion coefficient difference between core 510 and cladding 520, measured in (/°C.), can be less than 2%.

In an exemplary embodiment of the present invention where the materials and fiber parameters are adjusted, the absorption cross section can be controlled. The absorption cross section can be tailored to be in the range of $0.60 \times 10^{-24}$ $m^2$ to $0.72 \times 10^{-24}$ $m^2$, in the range of 1530 nm to 1540 nm. In certain embodiments, the absorption cross section can be in the range of about $0.61 \times 10^{-24}$ $m^2$ to $0.65 \times 10^{-24}$ $m^2$, in the range of about 1530 nm to 1540 nm, or in the range of about $0.62 \times 10^{-24}$ $m^2$ to $0.64 \times 10^{-24}$ $m^2$, in the range of about 1530 nm 1540 nm.

Figure 6:
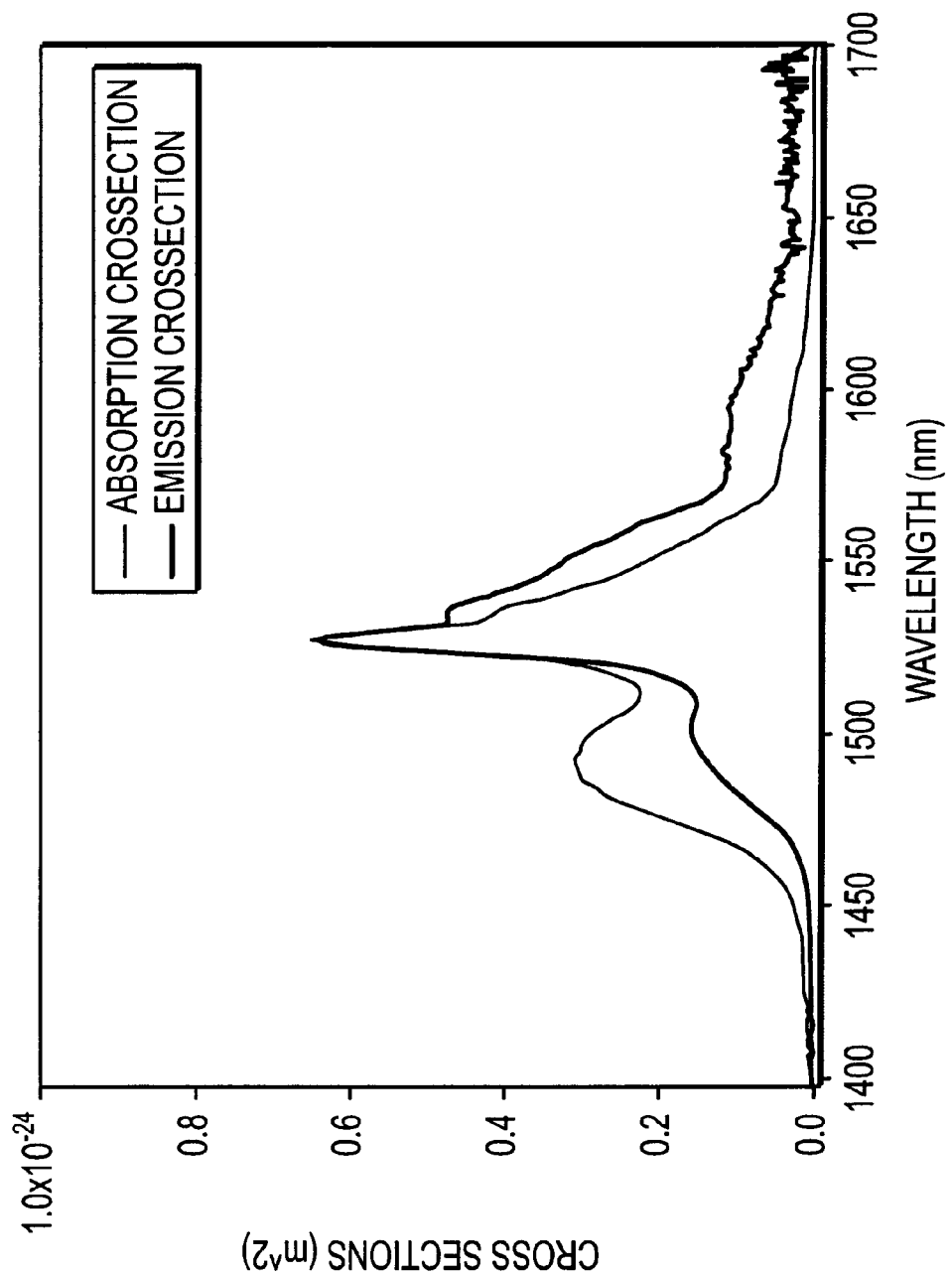
FIG. 6 is an exemplary absorption cross section spectrum for an optical amplifier fiber according to an exemplary embodiment of the present invention.

FIG. 6 shows a graph of the measured absorption cross section of a fiber made according to the embodiments of the present invention. In this embodiment, the absorption cross section is approximately $0.625 \times 10^{-24}$ $m^2$ at 1535 nm.

In an embodiment of the present invention, materials and fiber parameters to fabricate the REGA can be chosen using a computer program. The computer program can consider the desired gain and design a set of manufacturing steps to accomplish the fiber. In an embodiment, there can be a computer readable medium containing instructions for controlling a computer-aided manufacturing system to perform a method for manufacturing optical amplifier fibers and waveguides of the present invention.

Figure 7:
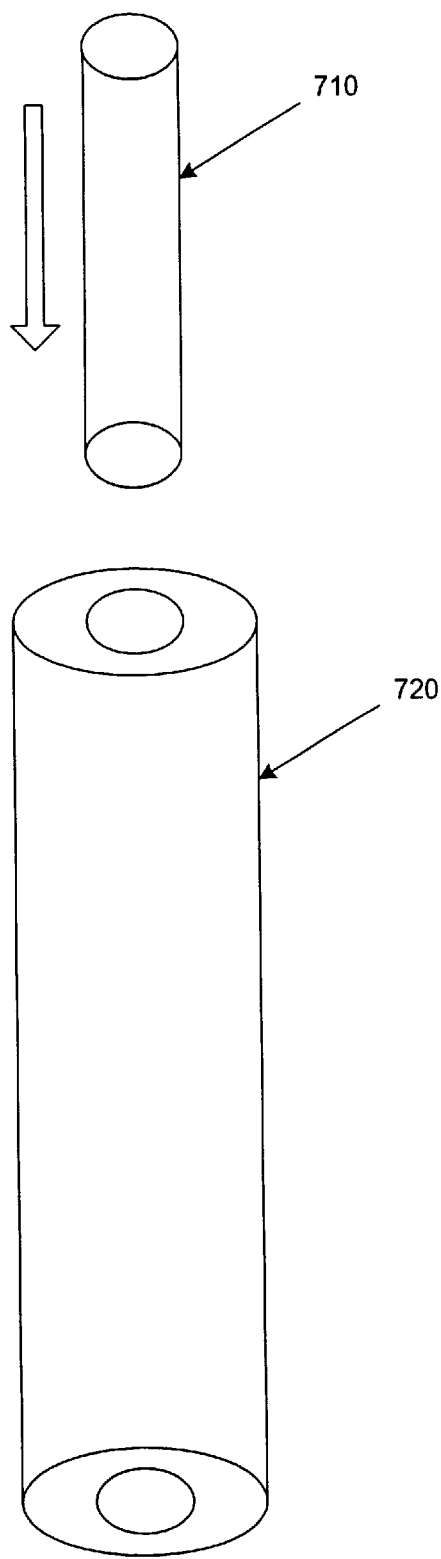
FIG. 7 is an exploded diagram of rod and tube method for making an optical amplifier fiber according to an exemplary embodiment of the present invention.
Figure 8:
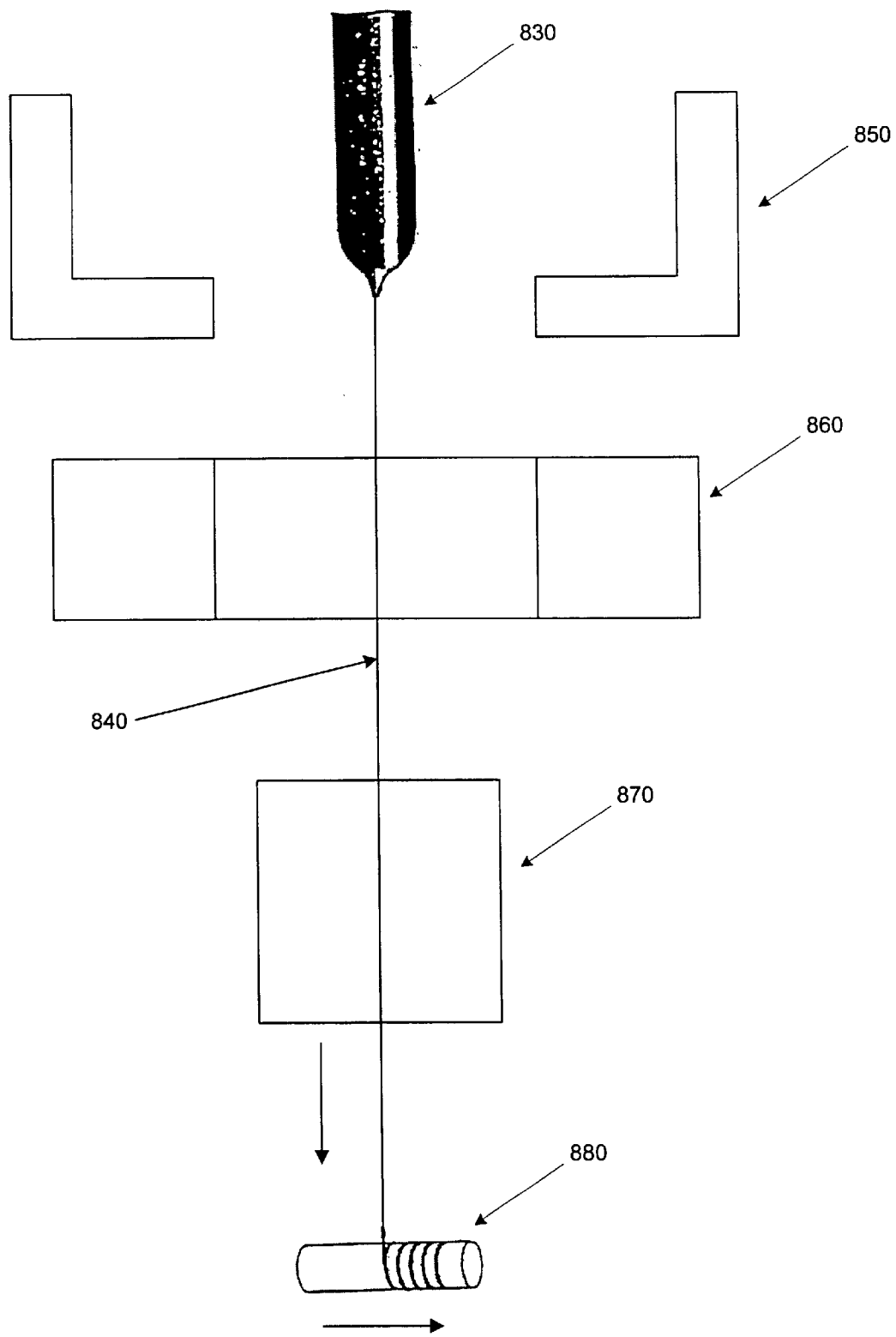
FIG. 8 is a diagram of the fabrication of an optical amplifier fiber according to an exemplary embodiment of the present invention.

Shown in FIGS. 7 and 8 are exemplary methods of making the optical amplifier fiber. In FIG. 7, the optical amplifier fiber is made by the rod and tube method. In this embodiment, a phosphate glass rare earth doped rod 710 and a phosphate glass tube 720 are formed. Different methods can be used to make rod 710 and tube 720, such as casting molten glass into molds, machining a bulk starting material block, or rotational casting.

In an embodiment, rod 710 is doped with the rare earth element while tube 720 remains substantially free from rare earth doping. In addition, rod 710 and tube 720 can doped with the index doping material at the levels needed to achieve the desired NA. As can be seen from FIG. 7, rod 710 is inserted into tube 720. The resulting rod and tube structure can be thermally annealed to form a pre-form 830, shown in FIG. 8.

In FIG. 8, a fiber 840 is drawn from preform 830 and fed through a furnace 850. Furnace 850 heats drawn fiber 840 to a temperature between its glass transition temperature and its melting point. Passing through furnace 850 softens rod 710 and tube 720. The softening smoothes roughness on the outside surface of rod 710 and the inside surface of tube 720 and aids in bonding the two together. Rod 710 and tube 720 become core 510 and cladding 520, respectively, of the optical amplifier fiber 505, shown in FIG. 5. Fiber 840 is directed through a diameter monitor 860 to accurately control the diameter of optical amplifier fiber 505. In an exemplary embodiment, fiber 840 passes through a coater 870 to deposit a protective coating over fiber 840. In certain embodiments, the coating can be a polymer. Once fiber 840 has been coated, it can be wound on a winding drum 880 for safe storage and easy dispensing.

Referring back to FIG. 3A, a plurality of lenses 80 are disposed within module 10 along signal path 30 between signal input 12 and signal output 16. Lenses 80 collimate and couple the light signal L and the pump signal P. Lenses 80 can be spherical, aspherical, or graded index. As shown in FIG. 3A, a first lens 82 is optically disposed between signal input 12 and optical isolator 40. A second lens 84 is optically disposed between optical isolator 40 and WDM coupler 50. Third and fourth lenses 86, 88 are disposed between the WDM coupler 50 and the amplifying gain medium 70. Although the locations of the lenses 80 are as described, those skilled in the art will recognize that some of the lenses 80 can be omitted and/or additional lenses can also be disposed along signal path 30 throughout module 10.

In an embodiment of the present invention, the components such as signal input 12, optical isolator 40, WDM coupler 50, pump laser 60, amplifying gain medium 70 and lenses 80 are optically coupled by free space coupling, although those skilled in the art will recognize that some or all of the components can be physically coupled as well. In an embodiment, amplifying gain medium 70 is physically coupled to signal output 16 and signal output 16 is physically coupled to output fiber 28. However, those skilled in the art will recognize that amplifying gain medium 70, signal output 16, and output fiber 28 can be coupled together by free space coupling as well.

The electronic components of module 10 will now be described. A terminal port 90 is disposed on a face other than first face 14. However, those skilled in the art will recognize that terminal port 90 can be disposed on first face 14. In an embodiment, terminal port 90 is an RS-232 connector, which is well known in the art. Terminal port 90 is electronically connected to pump laser 60 through a control board 65 in module 10, so that electronic and power signals generated by a controller/power supply (not shown) outside module 10 can control operation of pump laser 60 through terminal port 90 and control board 65. Control board 65 is disposed proximate heat sink 20 so that heat sink 20 can dissipate heat generated by control board 65 during operation of module 10.

In an embodiment of the present invention, module 10 is approximately 6 cm×1 cm×1 cm in size, although those skilled in the art will recognize that module 10 can be of different dimensions. In certain embodiments, however, the overall size of module 10 can be less than 10 cm³.

Referring to FIG. 3A, in operation, the pre-amplified light signal L is provided along input fiber 26 to signal input 12. The light signal L has a predetermined bandwidth, such as a 0.1 nm range between 1520 nm and 1560 nm, although those skilled in the art will recognize that light signal L can have a larger bandwidth and have other wavelengths as well. The light signal L travels along signal path 30 to first lens 82, which collimates the light signal L and directs the light signal L along signal path 30 toward optical isolator 40. The light signal L travels through optical isolator 40 and along signal path 30 to second lens 84. Second lens 84 again collimates the light signal L and directs the light signal L along signal path 30 to WDM coupler 50. The light signal L passes through WDM coupler 50 along signal path 30 toward third lens 86.

Simultaneously to the light signal L passing through WDM coupler 50, pump laser 60 emits the pump signal P, which is aimed at the downstream side of WDM coupler 50. In an embodiment, the pump signal P has a wavelength of either approximately 980 nm or 1480 nm, although those skilled in the art will recognize that other wavelengths can be used. The pump signal P reflects off WDM coupler 50 and enters signal path 30, where the pump signal P is aligned with the light signal L along the signal path 30. Pump laser 60 is controlled by control board 65, which is connected to the controller (not shown) through terminal port 90. Control board 65 controls the intensity of the pump signal P.

The combined light signal L and pump signal P travel along optical path 30 to and through third and fourth lenses 86, 88, which collimate the combined light and pump signals L, P and direct the combined light and pump signals L, P along signal path 30 to amplifying gain medium 70. Light from the pump signal P excites dopant ions in amplifying gain medium 70, raising them to a higher energy level as shown in FIG. 1.

Figure 1:
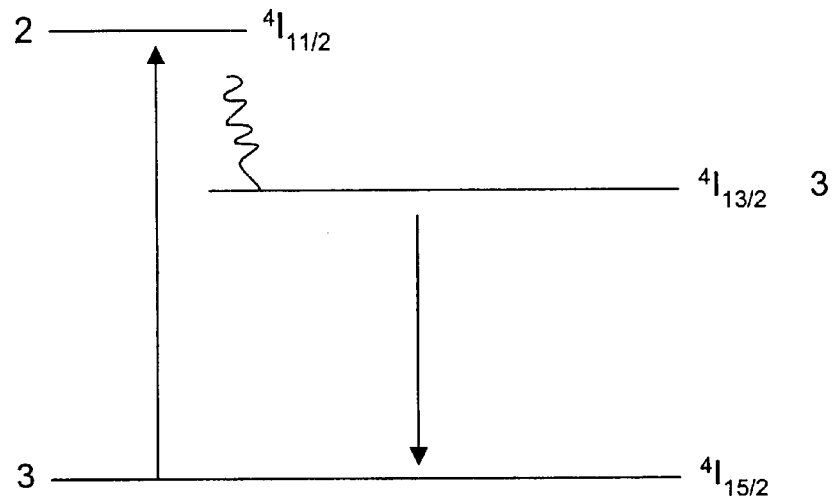
FIG. 1 is a partial energy level diagram for $Er^{3+}$.

With reference to FIG. 1, in the amplifying gain medium 70, the dopant ions start out in their ground state, level 1. The electrons in the ions are then excited to level 2 by the pump beam P, equal to the transition energy from 1→2. The ions subsequently undergo fast nonradiative decay to level 3, which is the metastable state of the system. The lifetime of this state is very long in comparison to the nonradiative decay. As a consequence, a population inversion is created in level 3. Then, as the light signal L passes by the ions, the light signal L stimulates emission of photons from the ions with the same signal energy. This stimulated decay is from level 3 to level 1, the ground state. The excited ions emit the photons at the same wavelength as the light signal L and in phase with the light signal L, thus amplifying the light signal L to the amplified light signal L'. The light signal L' continues to increase in strength along the amplifying gain medium 70 while the pump signal P is depleted.

The amplified light signal L' then exits amplifying gain medium 70 to signal output 16, where the amplified light signal L' continues along output fiber 28 to another component, such as another amplifier or to an end component, such as a de-multiplexer.

Alternative embodiments to the embodiment just described for FIG. 3A are illustrated in FIGS. 3B and 3C. In the embodiment of FIG. 3B, WDM coupler 50 is disposed downstream of amplifying gain medium 70. In this embodiment, pump laser 60 is disposed so that the pump signal "P", is reflected off the upstream side of the WDM coupler 50 and enters the amplifying gain medium 70 at the downstream end. The WDM coupler 50 is selected to allow the amplified light signal L' to pass through the WDM coupler 50. In the embodiment of FIG. 3C, two WDM couplers are disposed along the signal path. One WDM coupler is disposed upstream of the amplifying gain medium and the other is disposed downstream of the amplifying gain medium. In this manner the pump signal P1 emitted from a first pump laser 60 may enter the amplifying gain medium at the upstream end, while the second pump signal P2 from a second pump laser 60 may enter the amplifying gain medium at the downstream end.

Those skilled in the art will recognize that module 10 can be fabricated to be used in a variety of environments, such as in long-haul terrestrial, submarine, access, metro, local area network (LAN), and other types of applications. For a module 10 using a high gain erbium doped fiber, a −10 dB optical signal can be transmitted up to approximately 50 km between amplifier modules 10.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An optical fiber amplifier module, comprising:
   a signal path located between a signal input and a signal output;
   a first WDM coupler disposed along the signal path;
   an amplifying gain medium disposed along the signal path; and
   a first pump laser which emits a first pump signal, wherein the first pump laser is disposed out of the signal path in a manner that allows the first pump signal to reflect off the first WDM coupler and enter the signal path, wherein the first WDM coupler is optically coupled to at least one component chosen from the amplifying gain medium and the first pump laser by free space coupling.

2. The optical amplifier module of claim 1, further comprising an optical isolator disposed along the signal path.

3. The optical amplifier module of claim 2, further comprising a plurality of lenses disposed along the signal path.

4. The optical amplifier module of claim 3, wherein at least one lens is optically disposed between the signal input and the optical isolator.

5. The optical amplifier module of claim 4, wherein at least one lens is optically disposed between the optical isolator and the first WDM coupler.

6. The optical amplifier module of claim 5, wherein at least one lense is optically disposed between the first WDM coupler and the amplifying gain medium.

7. The optical amplifier module of claim 3, wherein the signal input, the optical isolator, the WDM coupler, the pump laser, the amplifying gain medium, and the lenses are optically coupled by free space.

8. The optical amplifier module of claim 7, wherein the amplifying gain medium is physically coupled to the signal output.

9. The optical amplifier module of claim 2, wherein the optical isolator is proximate to the signal input.

10. The optical amplifier module of claim 1, wherein the amplifying gain medium comprises a high gain rare earth doped phosphate glass optical amplifier fiber.

11. The optical amplifier module of claim 10, wherein the fiber comprises erbium.

12. The optical amplifier module of claim 11, wherein the erbium ion concentration exceeds $10^{21}$ ions/cm$^3$.

13. The optical amplifier module of claim 12, wherein the fiber is from about 1 cm to about 8 cm long.

14. The optical amplifier module of claim 12, wherein the fiber is approximately 2 cm long.

15. The optical amplifier module of claim 1, further comprising a second WDM coupler and a second pump laser which emits a second pump signal.

16. The optical amplifier module of claim 15, wherein the first WDM coupler is disposed so as to reflect the first pump signal along the signal path and into the upstream end of the amplifying gain medium, while the second WDM coupler is disposed so as to reflect the second pump signal along the signal path and into the downstream end of the amplifying gain medium.

17. The optical amplifier module of claim 15, wherein the second pump laser is optically coupled to the second WDM coupler by free space coupling.

18. The optical amplifier module of claim 1, wherein the amplifying gain medium is a rare earth doped optical planar waveguide.

19. The optical amplifier module of claim 18, wherein the waveguide is curved.

20. The optical amplifier module of claim 1, further comprising a terminal port electronically connected to the pump laser through a control board.

21. The optical amplifier module of claim 20, further comprising a heat sink disposed proximate to the control board.

22. The optical amplifier module of claim 1, wherein the first WDM coupler comprises a thin film based filter.

23. The optical amplifier module of claim 1, wherein the first WDM coupler is disposed upstream of the amplifying gain medium.

24. The optical amplifier module of claim 1, wherein the first WDM coupler is disposed downstream of the amplifying gain medium.

25. The optical amplifier module of claim 1, wherein the size of the module is less than 10 cm$^3$.

26. The optical amplifier module of claim 1, wherein the amplifying gain medium comprises a high gain rare earth doped phosphate glass optical amplifier fiber.

27. An optical fiber amplifier module, comprising:
a signal path located between a signal input and a signal output;
an optical isolator disposed along the signal path downstream of the signal input;
a WDM coupler disposed along the signal path downstream of the optical isolator;
an amplifying gain medium disposed along the signal path downstream of the WDM coupler, wherein the amplifying gain medium comprises high gain rare earth doped phosphate glass optical amplifier fiber; and
a pump laser disposed downstream of the WDM coupler and out of the signal path in a manner that allows the pump signal from the pump laser to reflect off the downstream side of the WDM coupler and enter the signal path;
wherein the WDM coupler is optically coupled to at least one component chosen from the amplifying gain medium and pump laser by free space coupling.

28. The optical amplifier module of claim 27, wherein the WDM coupler is optically coupled by free space to the pump laser and the amplifying gain medium.

29. An optical fiber amplifier module, comprising:
a signal path located between a signal input and a signal output;
an optical isolator disposed along the signal path downstream of the signal input;
an amplifying gain medium disposed along the signal path downstream of the optical isolator, wherein the amplifying gain medium comprises a high gain rare earth doped phosphate glass optical amplifier fiber;
a WDM coupler disposed along the signal path downstream of the amplifying gain medium; and
a pump laser disposed out of the signal path in a manner that allows the pump signal from the pump laser to reflect off the WDM coupler and enter the signal path; and
wherein the WDM coupler is optically coupled to at least one component chosen from the amplifying gain medium and pump laser by free space coupling.

30. The optical amplifier module of claim 29, wherein the WDM coupler is optically coupled by free space to the pump laser and the amplifying gain medium.

31. An optical fiber amplifier module, comprising:
a signal path located between a signal input and a signal output;
an optical isolator disposed along the signal path downstream of the signal input;
a first WDM coupler disposed along the signal path downstream of the optical isolator;
an amplifying gain medium disposed along the signal path downstream of the first WDM coupler;
wherein the amplifying gain medium comprises a high gain rare earth doped phosphate glass optical amplifier fiber;
a first pump laser disposed out of the signal path in a manner that allows the pump signal from the first pump laser to reflect off the downstream side of the first WDM coupler and enter the signal path;

a second WDM coupler disposed along the signal path downstream of the amplifying gain medium; and a second pump laser disposed out of the signal path in a manner that allows the pump signal from the second pump laser to reflect off the downstream side of the second WDM coupler and enter the signal path;

wherein the first WDM coupler is optically coupled to at least one component chosen from the amplifying gain medium and first pump laser by free space coupling, and further wherein the second WDM coupler is optically coupled to at least one component chosen from the amplifying gain medium and second pump laser by free space coupling.

* * * * *